W. T. THORP.
TATTING SHUTTLE.
APPLICATION FILED JUNE 13, 1919.

1,349,741.   Patented Aug. 17, 1920.

Inventor
W. T. Thorp
By Victor J. Evans
Attorney

Witnesses
E. R. Ruppert

UNITED STATES PATENT OFFICE.

WILLIAM T. THORP, OF HILLSBORO, ILLINOIS.

TATTING-SHUTTLE.

1,349,741.  Specification of Letters Patent.  Patented Aug. 17, 1920.

Application filed June 13, 1919. Serial No. 303,870.

*To all whom it may concern:*

Be it known that I, WILLIAM T. THORP, a citizen of the United States, residing at Hillsboro, in the county of Montgomery and State of Illinois, have invented new and useful Improvements in Tatting-Shuttles, of which the following is a specification.

This invention relates to improvements in tatting-shuttles and one of the objects of the invention is to provide the shuttle with a removable reel which is provided with a handle for rotating the same to wind the thread thereon.

Another object of the invention is to provide the shuttle with a point for removing knots from the article to be made.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
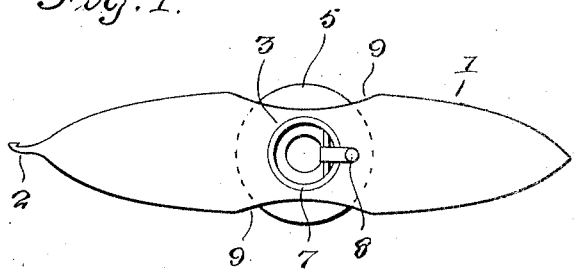
Figure 1 is a side elevation of the invention.
Figure 2:
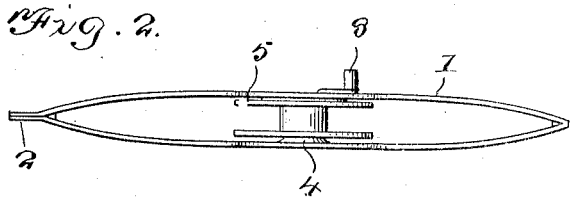
Fig. 2 is an edge view.
Figure 3:
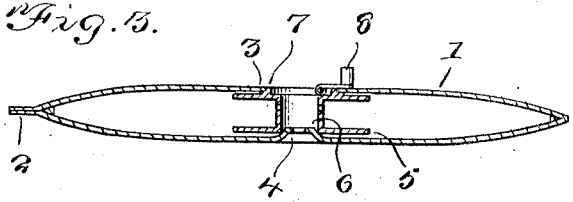
Fig. 3 is a longitudinal section.
Figure 4:
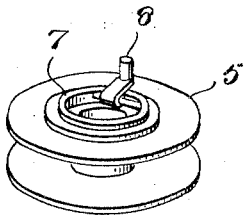
Fig. 4 is a perspective view of the reel removed.

In these views 1 indicates the body of the shuttle which comprises the two side walls tapered from the center toward the pointed ends. These ends are tapered, as shown, and one end is provided with a pin 2. One of the sides of the body is provided with an opening 3 in the center thereof and the other side is provided with a depression or boss 4. 5 indicates the reel which is constructed as usual and consists of the two disks and the spool connecting the disks together. The spool is provided with holes so that the thread may be fastened thereto.

By making the reel removable, reels containing different colored thread may be used with the device and instead of using a pin I may use a hook at the end of the device.

The reel is provided with a central opening 6 and on one side the reel is provided with the circular rim 7 which surrounds the opening. This rim is adapted to fit within the opening in one of the side pieces of the body while the depression or boss in the other side piece engages with the opening in the other disk of the reel. In this manner the reel is rotatably supported in the body. A small crank handle 8 is pivoted to one wall of the opening in the disk, adjacent the rim so that when not in use the handle may be swung over into the opening and thus be out of the way and permit the passage of the reel between the sides of the body. When the reel is in place the handle may be swung outwardly so that the reel may be rotated within the body. I may form depressions 9 in the edges of the sides of the body at the center thereof so as to permit the reel to be rotated by the fingers.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a body having side walls tapering together at each end and connected together at said ends, a reel rotatably mounted in said body, said reel having a tubular journal engaging with one side of the body and a handle hingedly connected to said journal and adapted to be swung into the said journal when not in use.

2. A device of the class described comprising a body part having a boss on one side and an opening on the other side, a reel having a central opening therein, one end of which engages the boss, a circular rim on one side of the reel surrounding the opening and engaging the opening in the body and a crank handle pivotally mounted on the inner wall of said rim and adapted to be swung over into the opening in the reel.

In testimony whereof I affix my signature.

WILLIAM T. THORP.